Jan. 12, 1954
K. F. WEBER
TRANSMISSION
2,665,590
Filed March 16, 1951
3 Sheets-Sheet 1
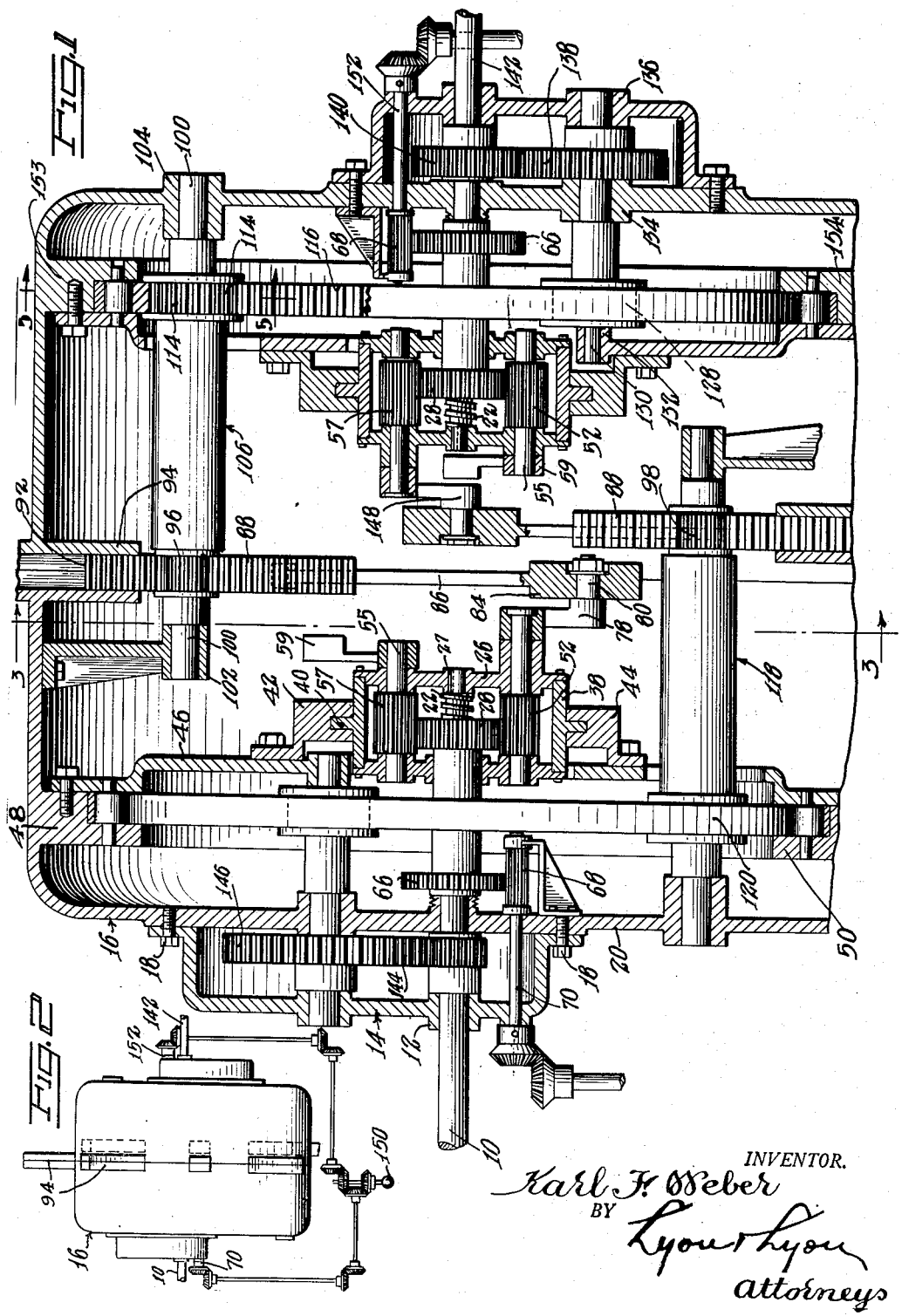
INVENTOR.
Karl F. Weber
BY
Lyon & Lyon
attorneys Jan. 12, 1954 K. F. WEBER 2,665,590
TRANSMISSION
Filed March 16, 1951 3 Sheets-Sheet 2

INVENTOR.
Karl F. Weber
BY Lyon & Lyon
Attorneys

Jan. 12, 1954                    K. F. WEBER                    2,665,590
                                 TRANSMISSION
Filed March 16, 1951                                        3 Sheets-Sheet 3
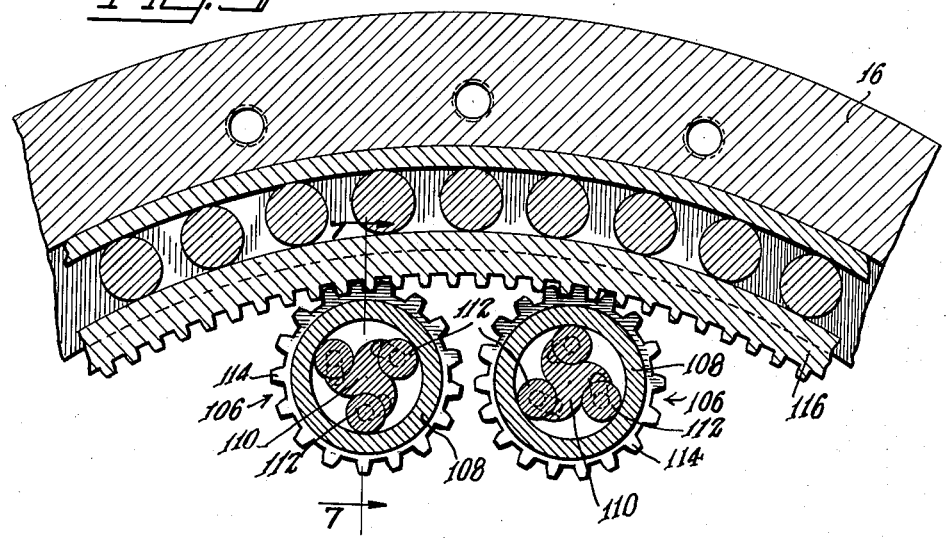
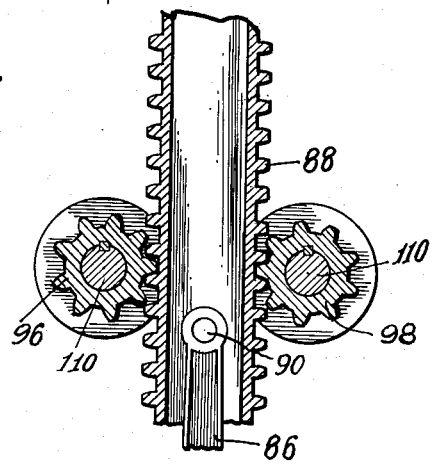
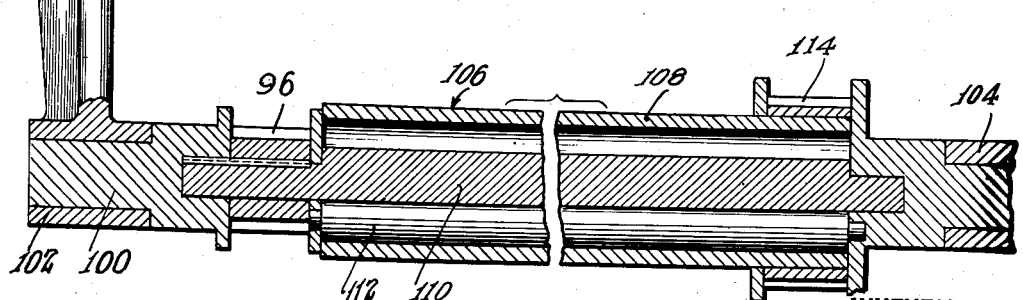
INVENTOR.
Karl F. Weber
BY
Lyon & Lyon
attorneys Patented Jan. 12, 1954

2,665,590

UNITED STATES PATENT OFFICE 2,665,590

TRANSMISSION

Karl F. Weber, Los Angeles, Calif.

Application March 16, 1951, Serial No. 215,989

5 Claims. (Cl. 74—121)

This invention relates to a transmission and more particularly to a wholly mechanical transmission.

It is an object of this invention to provide a transmission which eliminates shifting of gears to vary the ratio of rotation between a driving shaft and a driven shaft and hence is particularly adaptable for use in an automobile.

A further object of this invention is to provide a transmission wherein the parts thereof are easily accessible for repair and replacement.

Other objects and advantages of this transmission will be apparent from the following description.

Referring now to the drawings:

Figure 1 is a side elevational view in section of a transmission embodying this invention.

Figure 2 is a diagrammatic view of a control mechanism for this transmission.

Figure 5 is an enlarged fragmentary view in section taken along the line 5—5 of Figure 1.

Figure 6 is an enlarged fragmentary view illustrating the ratchet and pinion driving means.

Figure 7 is a sectional view taken along the line 7—7 of Figure 5.

Figure 3:
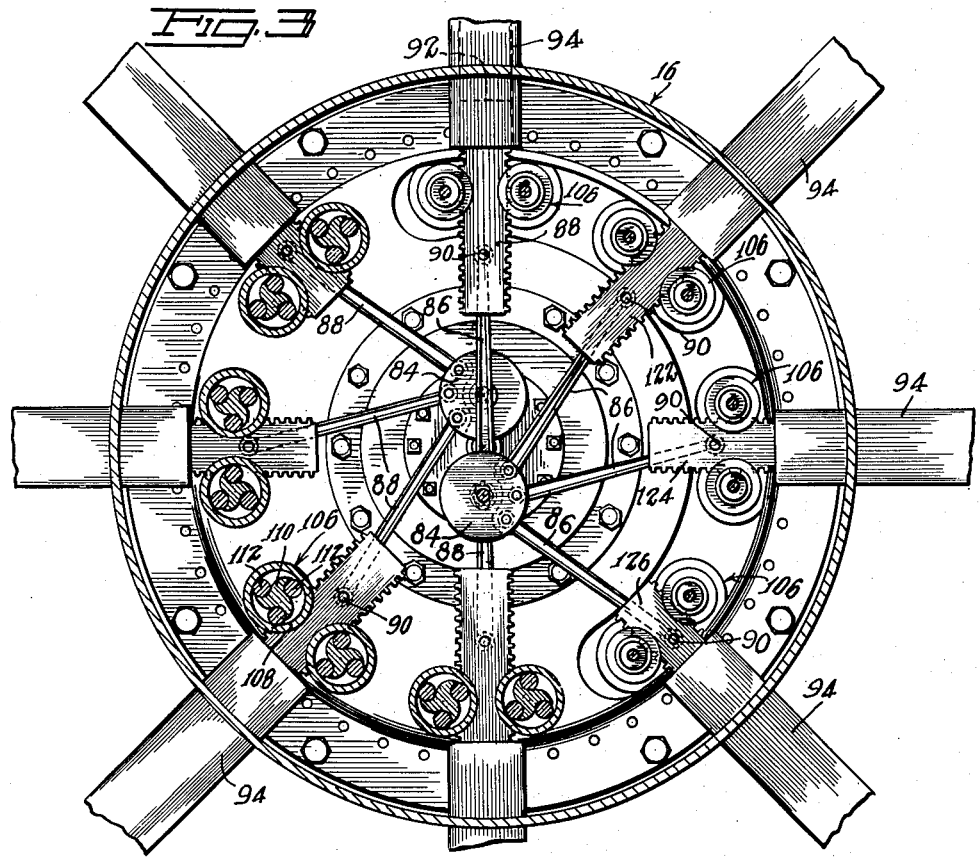
Figure 3 is a sectional view taken along line 3—3 of Figure 1.

A drive shaft 10 is caused to rotate by any suitable source of power, said shaft being supported by a bearing surface 12 in cap 14 which is journaled to receive said shaft and is in turn mounted upon casing 16, which will hereinafter be described, in any suitable manner such as by screws 18. The side 20 of casing 16 is also journaled to form a bearing surface for drive shaft 10.

On the portion of drive shaft 10 which projects into the casing a spiral gear 22 is suitably formed thereon or attached thereto, the extremity of said shaft being supported by the side wall 26 of the ratio varying means housing, which will be hereinafter described, said shaft 10 being keyed as at 27 to side wall 26 and causing said housing to rotate upon rotation of shaft 10.

A sleeve 28 which is threaded internally to mesh with the spiral gear 22 is provided with teeth forming an external spur gear for a purpose hereinafter to be described. This sleeve is provided with an internal annulus 30 adapted to receive flange 32 of the control sleeve 34 so that the sleeve 28 is free to rotate with respect to the control sleeve 34. Said flange 32 may be retained in the annulus 30 by split washer 33 which in turn is bolted or otherwise suitably secured to sleeve 28.

The ratio varying means housing comprises side wall 26 and side wall 36, which are releasably secured, by bolts in this embodiment, to an annular casing member 38, which in turn may be provided with an external guide flange 40 which guides the housing during rotation, said flange fitting into an appropriate recess in bearing members 42 and 44 in which the housing is rotatably supported. The bearing members are suitably mounted upon internal wall 46 which in turn is bolted to bearing members 48 and 50 formed in the casing 16.

Mounted in the ratio varying means housing is an external spur gear 52, hereinafter referred to as the positioning gear, which meshes with the sleeve 28. This positioning gear 52 is mounted on a shaft 54 which is rotatably mounted in the ratio varying means housing in bearings 56 and 58 formed in side walls 26 and 36 thereof. Positioning gear 52 is thus carried by rotation of the ratio varying means housing about the axis of drive shaft 10 but may also rotate about its own axis. Rotation of the positioning gear about its own axis is caused by lateral displacement of sleeve 28 on worm 22. Thus, when sleeve 28 is fixed laterally upon the worm by holding control sleeve 34 stationary, no rotation of positioning gear 52 about its own axis occurs during its rotation about the axis of drive shaft 10, there being no fixed connection between sleeve 28 and control sleeve 34. Upon lateral movement of control sleeve 34 on shaft 10, sleeve 28 is moved laterally also, which imparts additional rotation to sleeve 28 which in turn, meshing with positioning gear 52, causes it to rotate about its own axis, the result of which will be hereinafter described.

Control sleeve 34 is threaded internally as indicated at 60 a considerable portion of its length, which threads mesh with the external threads 62 on the support 64 which may be formed integrally with side 20 of casing 16. In this embodiment an external spur gear 66 is rigidly mounted on control sleeve 34. This spur gear 66 meshes with the control gear 68 suitably mounted upon control shaft 70 which is supported by bearings 72 and 74 suitably formed in casing 16. Thus it is apparent that rotation of control shaft 70 rotates gear 68 which in turn rotates gear 66 and control sleeve 34. This rotation of control sleeve 34 will cause it to move laterally on support 64, the direction of travel being dependent on the direction of rotation of control shaft 70. The lateral motion of control sleeve 34 causes positioning gear 52 to rotate about its axis as hereinbefore described. The gear 68 is preferably of an elongated construction to continue to mesh with gear 66 upon movement of the latter as control sleeve 34 moves laterally.

Figure 4:
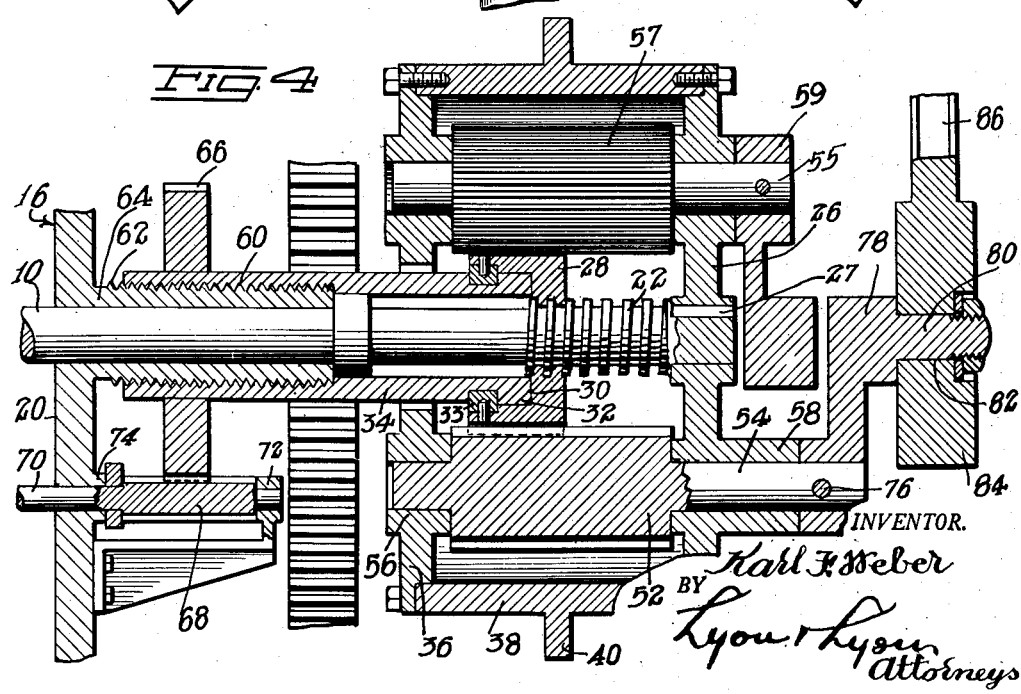
Figure 4 is an enlarged view of a vertical section of the ratio varying means of this transmission.

The shaft 54 upon which the positioning gear 52 is mounted projects through the side wall 26 of the ratio varying means housing. Suitably connected, as by key 76, to said shaft 54 is a crank 78 the length of which, in this embodiment, positions the center axis of crank 78 to form a continuation of the center axis of shaft 10. A threaded bolt 80 is formed on the crank 78 which projects through a suitable aperture 82 in circular plate 84 to which connecting rod 86 is suitably connected. It is apparent that when the ratio varying means is positioned as seen in Figure 4, the device is on center; that is, rotation of drive shaft 10 will not result in any vertical reciprocating movement of the connecting rod 86. Rotation of control shaft 70 will result in rotation of positioning gear 52 about its own axis, as previously described, which rotates crank 78 away from the center position seen in Figure 4 towards the open position seen in Figure 1. The further off center crank 78 is moved the greater the reciprocal movement imparted to connecting rod 86 which is, of course, controlled by positioning of shaft 70.

Mounted upon shaft 55 which is rotatably mounted in the ratio varying means housing in the same manner as shaft 54 is a gear 57 which corresponds to positioning gear 52. This gear 57 meshes with sleeve 28 and is rotated about its axis the same as positioning gear 52. Attached to gear 57 is a counterbalance 59 which swings away from the center position a distance corresponding to movement of crank 78. Thus when the ratio varying means housing is rotated by drive shaft 10, it is balanced, preventing harmful stresses being exerted on the mechanism.

The connecting rod 86 is pivotally connected to rack 88 fitting into a slot in the lower extremity of said rack and being retained therein by a pin 90 which projects through suitable apertures in said rack and the extremity of said connecting rod. The slot in the extremity of rack 88 should be sufficiently large so that the connecting rod 86 will not strike the sides of said rack at any possible position of said connecting rod as it is carried by circular plate 84. The rack 88 at its upper extremity 92 fits within and is guided by guideway 94 formed in casing 16 so that it oscillates back and forth in said guideway.

Pinion gears 96 and 98 are positioned on each side of and meshed with said rack 88 so that said pinions are rotated by the reciprocal motion of said rack, first in one direction and then in the other. Each of the pinions and its cooperating mechanisms are identical so only the mechanism associated with pinion 96 will be described in detail. Said pinion 96 is mounted upon a shaft 100 which is supported at each extremity in suitable bearings 102 and 104 formed in casing 16. A ratchet generally designated 106 is also mounted upon shaft 100 and operably connected to pinion 96. This ratchet may be of any type and in this embodiment it is illustrated as comprising a sleeve 108, as best seen in Figure 5, a body member 110 rotatably mounted therein and friction rods 112 retained in suitable recesses in said body member. The pinion 96 is rigidly connected to said body member 110, as best seen in Figure 7. Thus, upon clockwise rotation of said pinion, which rotation is created by the downstroke of rack 88, the friction rods engage the sleeve and rotate it, while upon counterclockwise rotation of said pinion 96, created upon the up stroke of said rack 88, the body member 110 is rotated counterclockwise and the friction rods do not engage sleeve 108 so it is not rotated counterclockwise.

Rigidly mounted on the sleeve 108 is an external spur gear 114 which is rotated by rotation of said sleeve. This spur gear 114 meshes with an internal gear 116 and causes it to rotate. Since rotation of spur 114 is in one direction only and only upon the down stroke of rack 88, a second pinion 98 similarly engages the rack 88 on the side opposite pinion 96. This pinion is driven in a clockwise direction upon the up stroke of rack 88. This clockwise rotation is imparted through ratchet 118 to a spur gear 120 in the same manner as spur 114 is driven. Spur 120 meshes with and drives internal gear 116 in the same direction and while spur 114 is idling. This construction insures a continuous movement of internal gear 116.

Referring now to Figure 3, it is preferred to provide a plurality of racks such as 88, 122, 124 and 126, each pivotally connected to circular plate 84 by an appropriate connecting rod with the exception of the master connecting rod 86 which is preferably rigidly connected to said plate 84. These racks in turn each have a pair of pinions, ratchets and spur gears corresponding to pinions 96 and 98, ratchets 106 and 118, and spur gears 114 and 120, respectively. By provision of a plurality of such mechanisms, the internal gear 116 may be driven by a continuous force insuring a smooth rotation thereof.

A spur gear 128 mounted on shaft 130 which in turn is supported by suitable bearings 132, 134 and 136 formed in casing 16 meshes with and is driven by internal gear 116. A spur gear 138 is also rigidly mounted on shaft 130 and rotated by rotation of gear 128. This spur 138 meshes with and drives gear 140 which in turn rotates the driven shaft 142.

It is apparent that the ratio of rotation of driven shaft 142 to that of drive shaft 10 is controlled by two things: the size of gears used in the device, and the length of stroke of the ratchets which in turn is controlled by the positioning of crank 78 and in turn is controlled by rotation of control shaft 70.

It is apparent, therefore, that the ratio may be varied within any practical limits established, for example, from zero to one to one, it being also apparent that the driven shaft is stopped when the crank 78 is on center position as seen in Figure 4 as no oscillatory motion is imparted to the racks, and that the ratio is at its greatest when the crank 78 is pivoted as far as possible from on center as seen in Figure 1.

Thus it is apparent that when the crank 78 is slightly off center a ratio approaching infinity is created between the speed of rotation of drive shaft 10 and driven shaft 142 which ratio decreases as crank 78 is positioned further off center. Thus all jerking motion is eliminated as the ratio changes and approaches the opposite limit of ratio, which may be fixed at 1:1 or any other suitable ratio as hereinbefore described.

In order that the mechanism be more sensitive to a reduction in the ratio between rotation of the drive shaft and the driven shaft or to a reduction of speed of rotation of the driven shaft, it is desirable to duplicate the device as described to act as a damper due to the free wheeling action of the ratchets; that is, to use the rotation of the driven shaft 142 as a source of power and drive it back through the same type of device, ultimately resulting in rotation of spur gear 144 which meshes with spur gear 146 which is integral with drive shaft 10. Thus, as the speed of rotation of drive shaft 10 or the ratio of rotation is reduced, a drag is created in this dampening system which makes driven shaft 142 responsive to such changes.

It is of course apparent that the ratio between rotation of the driven shaft 142 and drive shaft 10 should be substantially the inverse of the ratio of rotation of drive shaft 10 to driven shaft 142 in the principal system; that is, if the first-mentioned ratio is 4:1, then the second-mentioned ratio should be substantially equal to but not greater than 1:4. This necessitates that the positioning of crank 78 in the principal system and of crank 148 of the dampening system by synchronized so that one is in the on center position when the other is in the open position, and vice versa, and also necessitates that there will exist the proper ratios in all the intermediate positions of the cranks. The crank 148 of the dampening system should never be exactly on center with reference to the axis of the shaft 142 to avoid free wheeling.

There is illustrated in Figure 2 one possible mechanism for accomplishing this result. The common control is by knob 150 which upon rotation imparts the same degree of rotation in the same direction to control shaft 70 and control shaft 152. It is apparent that many devices are adaptable to synchronizing the pivoting of cranks 78 and 148.

The casing 16 may be provided with bearings such as 48 and 50 and 153 and 154 which are recessed to support and guide the internal gears during rotation of said gears.

It is apparent that this transmission can readily be provided with a reverse by insertion of a gear between gears 138 and 140 which of course will drive driven shaft 142 in the opposite direction from drive shaft 10. This reversing gear can be retractably inserted between gears 138 and 140 in any manner well known to those skilled in the art.

While the preferred embodiment of this invention has been described, it is not intended to limit the invention to the details but to the full scope of the appended claims.

I claim:

1. A device of the class described comprising: a drive shaft, a plate, a crank operably connecting said plate to said drive shaft, means for pivoting said crank to position the axis of said plate with respect to the axis of said drive shaft, means for converting rotational motion of said plate to lineal oscillatory motion, means for converting said lineal oscillatory motion to rotary motion, a second plate, a driven shaft, a crank connecting said second plate to said driven shaft, means for pivoting said last mentioned crank to position the axis of said second plate with respect to the axis of said driven shaft, means for converting rotational motion of said second plate to lineal oscillatory motion, means for converting said lineal oscillatory motion to rotary motion, and means for imparting said rotary motion to said drive shaft.

2. A device of the class described comprising: a drive shaft, a plate, a crank operably connecting said plate to said drive shaft, means for pivoting said crank to position the axis of said plate with respect to the axis of said drive shaft, at least one rack operably connected to said plate whereby rotation of said plate imparts lineal oscillatory motion to said rack, a pinion meshing with each of said racks, a ratchet connected to said pinion transmitting rotation in one direction only, a driven shaft, means for imparting said single direction rotation to said driven shaft, a second plate, a crank operably connecting said plate to said driven shaft, means for pivoting said last mentioned crank to position the axis of said second plate with respect to the axis of said driven shaft, at least one rack operably connected to said second plate whereby rotation of said second plate imparts lineal oscillatory motion to said rack, a pinion meshing with each of said racks, a ratchet connected to said pinion transmitting rotation in one direction only, and means for imparting said single direction rotation to said drive shaft.

3. A device of the class described comprising: a drive shaft, a plate, a crank operably connecting said plate to said drive shaft, means for pivoting said crank to position the axis of said plate with respect to the axis of said drive shaft, at least one rack operably connected to said plate whereby rotation of said plate imparts a lineal oscillatory motion to said racks, a pair of pinions meshing with each of said racks one on each side of said racks, a ratchet connected to each of said pinions transmitting rotation in one direction only, a driven shaft, means for imparting said single direction rotation to said driven shaft, a second plate, a crank operably connecting said plate to said driven shaft, means for pivoting said last mentioned crank to position the axis of said second plate with respect to the axis of said driven shaft, at least one rack operably connected to said plate whereby rotation of said plate imparts a lineal oscillatory motion to said racks, a pair of pinions meshing with each of said racks, a ratchet connected to each of said pinions transmitting rotation in one direction only, and means for imparting said single direction rotation to said drive shaft.

4. A device of the class described comprising: a drive shaft, means for converting rotary motion of said drive shaft to oscillatory lineal motion, means for varying the length of strokes of said lineal oscillatory motion, a driven shaft, means for converting said lineal oscillatory motion to rotary motion of said driven shaft, means for converting rotary motion of said driven shaft to lineal oscillatory motion, means for varying the length of strokes of said last mentioned lineal oscillatory motion, means for converting said last mentioned lineal oscillatory motion into rotary motion, and means for imparting said last mentioned rotary motion to said drive shaft.

5. A device of the class described comprising: a drive shaft, means for converting rotary motion of said drive shaft into lineal oscillatory motion, means for controlling the length of strokes of said lineal oscillatory motion, a driven shaft, means for converting said lineal oscillatory motion to rotary motion of said driven shaft, means for converting rotary motion of said driven shaft into lineal oscillatory motion, means for controlling the length of strokes of said last mentioned lineal oscillatory motion, means for converting said last mentioned lineal oscillatory motion to rotary motion, and means for imparting said last mentioned rotary motion to said drive shaft.

KARL F. WEBER.

References Cited in the file of this patent

UNITED STATES PATENTS

| Number | Name | Date |
|---|---|---|
| 1,268,140 | Nagel | June 4, 1918 |
| 1,662,688 | Veber | Mar. 13, 1928 |
| 1,738,965 | Reina | Dec. 10, 1929 |
| 2,308,974 | Harper | Jan. 19, 1943 |
| 2,503,310 | Weiss | Apr. 11, 1950 |
| 2,528,148 | Johnston | Oct. 31, 1950 |
| 2,569,586 | Small | Oct. 2, 1951 |

FOREIGN PATENTS

| Number | Country | Date |
|---|---|---|
| 5,463 | Great Britain | July 23, 1914 |
| 330,634 | Italy | Oct. 21, 1935 |
| 449,460 | France | Feb. 27, 1911 |
| 468,059 | Germany | Nov. 7, 1926 |
| 724,757 | France | May 2, 1932 |